CHARLES H. POTTER.
Improvement in Bee-Hives.
No. 127,513.　　　　　　　　　　　Patented June 4, 1872.
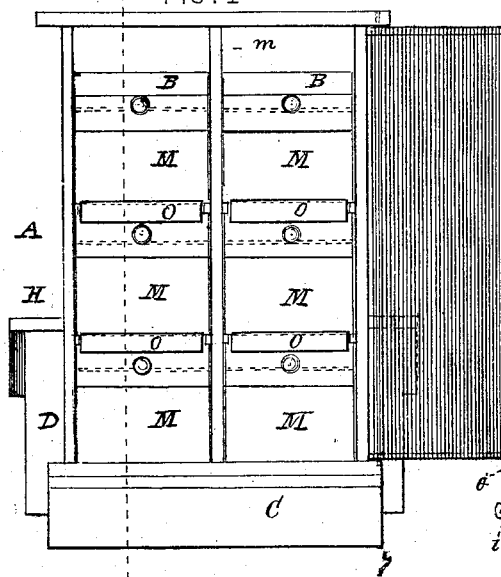
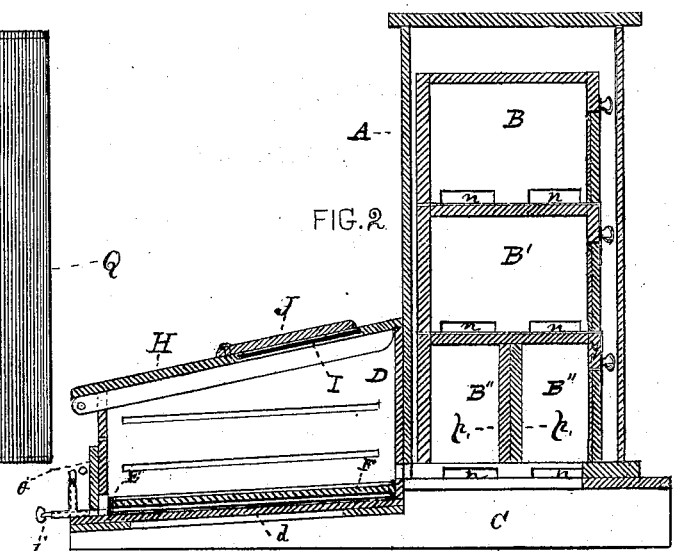
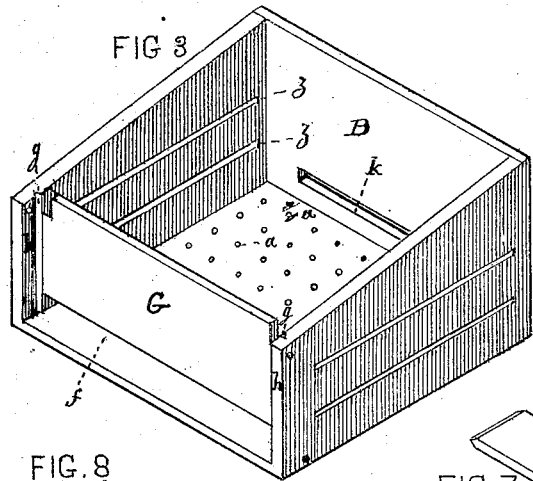
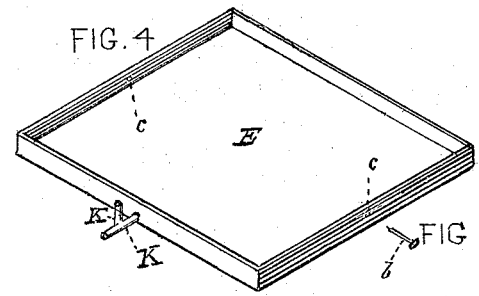
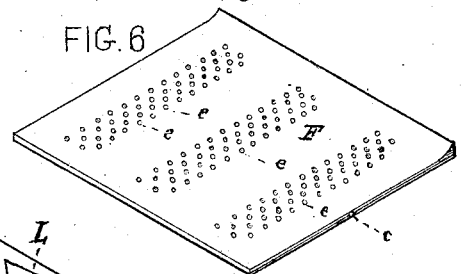
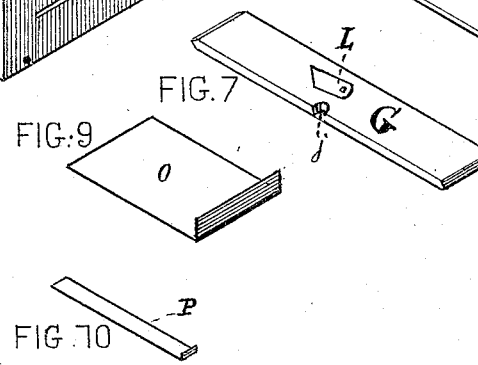
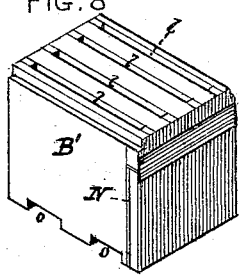
WITNESSES
J. H. Wendell
Jos. S. Holdrege
INVENTOR.
Charles H. Potter
By his Attorney
Stephen Ustick 127,513

UNITED STATES PATENT OFFICE.

CHARLES H. POTTER, OF PHILADELPHIA, PENNSYLVANIA.

IMPROVEMENT IN BEE-HIVES.

Specification forming part of Letters Patent No. 127,513, dated June 4, 1872.

SPECIFICATION.

I, CHARLES H. POTTER, of the city of Philadelphia and State of Pennsylvania, have invented a combined series of Bee-Hives and Feeder, of which the following is a specification:

My invention mainly consists of a feeding apparatus, constructed as hereinafter described, for supplying the bees with appropriate food for the making of honey. By this arrangement the honey-making season is prolonged and the irregularities incidental to the plan of collecting the food from the flowers got rid of. The apparatus consists of a box or case properly ventilated and having communication with the hives, and a pan for containing the food for the bees, there being a perforated floor connected with it, through which the bees get their food by inserting their bills in the perforations in the manner of getting it from flowers. The feed-pan is provided with a water-supply pipe, which is used for flooding it for driving the bees into the hives when a renewal of the food or other cause requires their exit from the feeding-box. This pipe is also used for discharging the water from the pan in cleaning out the same. I construct some of the hives or boxes with double partitions, so that by sawing the parallel sides apart, with which the partitions are connected, the boxes are separated for convenience in selling the same.

In the accompanying drawing, which makes a part of this specification, Figure 1 is a rear elevation of the hives B B, B' B', and B'' B'', and containing case A. Fig. 2 is a vertical section at the line $x$ $x$ of Fig. 1. Fig. 3 is an isometrical view of the box D, the cover H being removed. Fig. 4 is a like view of the feed-pan E. Fig. 5 is a view of one of the pins $b$. Fig. 6 is a view of the perforated floor F. Fig. 7 is a view of the slide G of the box D. Fig. 8 is a view of one of the hives B'. Figs. 9 and 10 are views, respectively, of the slides O and P.

Like letters in all the figures indicate the same parts.

A is a case, in which are two rows of hives, B B, B' B', and B'' B''. C is a foundation-frame, which supports the case A and the box D, which is provided with the feed-pan E and feeding-floor F. The box D, seen in detail in Fig. 3, has slots $z$, or other openings, for ventilating the same. The slots incline upward from the outside of the box so as to prevent the water running into the latter in time of rain. The bottom of the box has perforations $a$ for the passage of air into the same to keep the feed-pan E cool. The pan and feeding-floor F are shown in detail in Figs. 4 and 6, respectively. The latter is hung in the former by means of pins $b$ and holes $c$ in the sides of the trough and two opposite edges of the board. One of the pins is shown withdrawn in Fig. 5. The floor is so hung as to leave sufficient space, $d$, between it and the bottom of the pan E to contain the food for the bees. The said feeding-floor has perforations $e$ into which the bees protrude their bills to procure food. There is a slot, $f$, in the front of the box D for the withdrawal of the pan E for cleaning the same. The slot is closed at other times by means of the vertical slide G, which is moved in the vertical grooves $g$ $g$ in the projections $h$ $h$ of two parallel sides of the box. This slide is represented in detail in Fig. 7. The box D is provided with a hinged cover, H, to provide for opening the box at suitable times to allow of the bees passing out in the open air for invigoration. I is a prospect-glass, for the purpose of examining the condition of the bees. To prevent the passage of light into the box at other times the glass is covered by means of the swivel-plate J. The pan E has a horizontal pipe, K, through which water is passed for flooding it when the bees have to be driven out into the hives for renewing the feed, or otherwise; the said pipe having in connection a vertical pipe, K', for the convenience of forcing the water into the pan, at which time the outer end of the pipe K is closed by means of the stopper $i$. The under edge of the slide G has a cross-groove, $j$, which covers the pipe K and admits of the slide resting on the bottom of the box D. When the bees are driven out of the box D by the charge of water, and the pan E is removed from the box, the slide G is allowed to drop into its lower position to close the slot $f$, and the swivel-plate L of the slide covers the cross-groove $j$, in the lower edge of the slide; and thus the bees are prevented passing out of the box D if they should return before the pan E is put back in the box. There is a slto, $k$, in the rear side of the box D, which leads into the lower part of the case A for the passage of the bees. The hives B B B' B' B'' B'' have hinged doors M, which admit of viewing the condition of the hives when the doors are opened through the prospect-glasses N in the front end of the hives, represented in Fig. 8. The hives B' B' and B'' B'' have slots $l$ in the top for the passage of the bees. The partition $m$ of the case A has openings $n$ in line with the lower edges of the hives B B' and the lower edges of the continuous side of each hive cross-grooves $o$ to correspond, so as to form free communication between the two rows of hives for the passage of the bees. There are like openings through the partition below the lower edges of the hives B''. The communication between the hives in each row is cut off and opened at pleasure by means of the slides O O, one of which is shown in detail in Fig. 9. The slides P P, one of which is shown in Fig. 10, are used for opening and closing communication between the two rows of hives.

The door Q of the case A should be kept closed, except when the condition of the hives is to be examined, for the purpose of darkening them.

The upper hives B B are the homes of the bees, and always remain in their position in the case A. The next two hives B' B' are intended for them to fill to be removed and set away until fall; then they are returned to their place—the bee-bread being for the winter use of the bees, and the brood to be hatched in the spring. On the removal of the hives B' B' the hives B'' B'' are put in their place, which are again removed when filled, and replaced with others of like construction during the continuance of the honey-making season.

The hives B'' B'' are constructed like the hives B' B', with the exception that they have middle partitions, $p$, seen in Fig. 2, which separate when the sides of the hives are sawed in two to make two boxes, for the convenience of selling.

What I claim as my invention, and desire to secure by Letters Patent, is—

1. The combination, with the box D, of the feed-pan E when provided with the hinged perforated floor F and water-pipes K and K', substantially in the manner and for the purpose set forth.

2. The double partitions $p$ of the hives or boxes B'' B'' to provide for separating the same, substantially as and for the purpose specified.

In testimony that the above is my invention I have hereunto set my hand and affixed my seal.

CHARLES H. POTTER. [L. S.]

Witnesses:
JACOB L. PAXSON,
JACOB R. MASSEY.